United States Patent
Juravic et al.

(10) Patent No.: US 8,535,745 B2
(45) Date of Patent: Sep. 17, 2013

(54) APPARATUS, SYSTEMS AND METHODS FOR MANUFACTURING FOOD PRODUCTS

(75) Inventors: Davor Juravic, San Pedro, CA (US); Yomayra Alvarez, Long Beach, CA (US); Oscar Ortiz, Hawthorne, CA (US); Dwayne P. McDowell, II, San Pedro, CA (US); Geoffrey Chase Thornhill, San Francisco, CA (US); Mark P. Donatucci, Manhattan Beach, CA (US); Franjo Baltorinic, Downey, CA (US)

(73) Assignee: Del Monte Corporation, San Francisco, CA (US)

( * ) Notice: Subject to any disclaimer, the term of this patent is extended or adjusted under 35 U.S.C. 154(b) by 300 days.

(21) Appl. No.: 13/036,847

(22) Filed: Feb. 28, 2011

(65) Prior Publication Data
US 2012/0219658 A1 Aug. 30, 2012

(51) Int. Cl.
*A23P 1/10* (2006.01)

(52) U.S. Cl.
USPC ........... 426/513; 426/646; 426/517; 426/802; 426/805; 425/444

(58) Field of Classification Search
USPC .......... 426/646, 512–518, 802, 805; 425/444
See application file for complete search history.

(56) References Cited

U.S. PATENT DOCUMENTS

| | | | |
|---|---|---|---|
| 1,327,806 A * | 1/1920 | Bunde | 425/95 |
| 2,185,174 A * | 1/1940 | Hendler | 425/556 |
| 3,642,417 A * | 2/1972 | Von Holdt | 425/443 |
| 4,054,967 A | 10/1977 | Sandberg | |
| 4,193,167 A | 3/1980 | Orlowski | |
| 4,514,434 A | 4/1985 | Goldberger | |
| 4,642,847 A | 2/1987 | Moss | |
| 6,368,092 B1 | 4/2002 | Lindee | |
| 8,029,267 B2 * | 10/2011 | Takao | 425/444 |
| 2005/0042322 A1 * | 2/2005 | Takao | 425/443 |
| 2008/0299264 A1 | 12/2008 | Torcatis | |
| 2012/0088005 A1 * | 4/2012 | Li et al. | 425/444 |
| 2012/0231132 A1 * | 9/2012 | Tournour et al. | 426/389 |

\* cited by examiner

Primary Examiner — Drew E Becker
(74) Attorney, Agent, or Firm — Dilworth Paxson LLP

(57) ABSTRACT

Apparatus, systems and methods are disclosed for manufacturing slices of sausages that appear to have been cut from a conventional round sausage log at an angle. An illustrative embodiment provides a manufacturing process for making portions to be finished into angled pet treats comprising: (a) providing a ground mix of proteinaceous material, flavor enhancers and preservatives to a forming chamber comprising: a fixed base surface, a fixed top surface, and a movable intermediate section insertable between said base and top surfaces, said intermediate section having a plurality of die cavities that each have a central axis oblique to the surface of said intermediate plate, said top surface having a plurality of feeder holes that overlap at least partially with said die cavities, (b) filling said plurality of die cavities via said feeder holes with said foodstuff, thereby forming a plurality of portions in shapes and dimensions that generally correspond to the shapes and dimensions of said die cavities, (b) moving said intermediate section containing said plurality of portions out of said chamber, (c) forcibly ejecting said portions with a plurality of longitudinal elements that reciprocate in and out of said die cavities along said central axis, thereby forming angled pet treats.

9 Claims, 11 Drawing Sheets

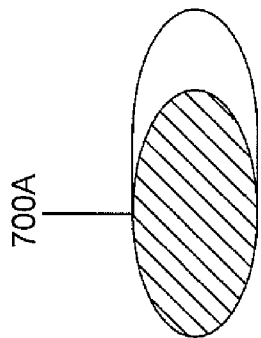
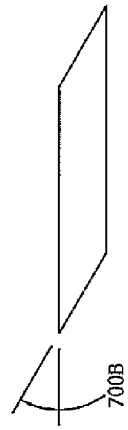
FIG. 7A
FIG. 7B
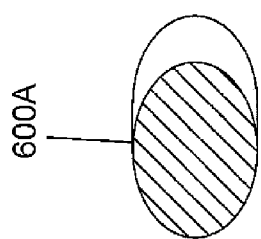
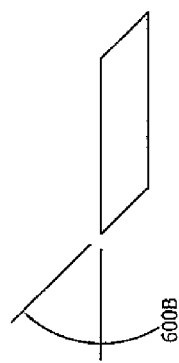
FIG. 6A
FIG. 6B
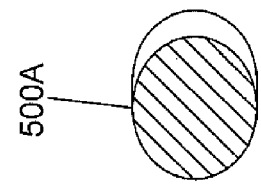
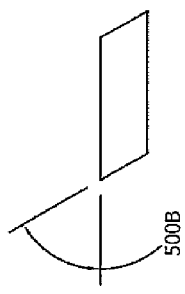
FIG. 5A
FIG. 5B

US 8,535,745 B2

APPARATUS, SYSTEMS AND METHODS FOR MANUFACTURING FOOD PRODUCTS

FIELD OF THE INVENTION

The present invention generally relates to apparatus, systems and methods for manufacturing food, more specifically angular patties, sausages or other proteinaceous products of variable texture for animal consumption.

BACKGROUND OF THE INVENTION

A large and growing number of households have pets. Studies have shown that pet owners often treat their pets as they treat close friends and relatives. Owners include pets in holiday celebrations, and often refer to themselves as the parents of their pets. Such affinity is tangibly demonstrated in the rapid growth of a multibillion dollar pet industry with an increasing demand for pet products that mimic human products.

Health conscious consumers are also demanding higher quality pet food that is not only closer in ingredient quality to human food, but also looks less processed and more natural. However, conventional pet food producers seldom focus on the visual impact of pet food that heightens aesthetic appeal to a purchaser, even if they integrate advanced ingredients more commonly found in food produced for human consumption.

Meat patties and related products for both human and animal consumption are commonly made using forming processes and systems, including a forming or mold plate and knockout cups. Typically, a meat emulsion is conveyed into cavities on a mold plate, and knocked out with cups that travel in a direction perpendicular to the process. Usually, patty forming plates have cavities with vertical sides which require vertically reciprocating knockout cups. With multiple cavities and knockout cups, the typical forming machine processes large quantities of food in an hour, and produce products that have the familiar disc-like shape of frozen hamburger patties. There have been some minor variations to this traditional process for meat patties, particularly for human consumption, where patties having more natural and irregular edges are formed, to cater to the demand of high end restaurants and their patrons. These newer techniques have been produced by forming meat under pressure in an irregularly shaped die cavity followed, by pressing the top and bottom surfaces together.

Processes used for human grade food are rarely suitable for the pet food market which has different requirements. For instance, human grade sausages or patties are usually designed for relatively short shelf lives. Pet food, on the other hand, is engineered to be stored (if necessary) for eighteen months after manufacturing before it is consumed, and therefore requires a substantially longer shelf life. Human grade sausage patties, once opened, become stale in less than a week unless refrigerated. Pet treats, however, are expected to last for up to three months after the package is opened, without refrigeration. The delay in the storage and consumption of pet foods requires more careful ingredient selection, preservation of freshness with antioxidants, processing that avoids insects and rancidity, careful packaging and storage.

Since high moisture meat products tend to spoil quickly, such products are usually sold in cans in the pet food market, and are more typical as cat food. Pet food or kibble with low moisture content (typically less than 10%), are dry and hard, and less palatable to pets. Semi-moist pet food, typically having moisture content between 15 and 30%, is very popular with animals since it has a texture and palatability that is closest to meat. However, as discussed, semi-moist pet food is difficult to store in a stable condition, without canning or refrigeration, for long periods.

Skinned sausage links for human consumption are made from beef, veal, pork, lamb, poultry and wild game, using a unique blend of old procedures and newer, highly-mechanized processes, However, the basic procedure of stuffing meat into casings to make sausages still remains commercially viable today. Skinned sausages are generally perceived to be of even higher quality than formed sausage patties for human consumption. Skinned sausages are typically sliced only after they are cooked, otherwise maintenance of slice integrity is difficult. When sliced, typically by hand before a meal, the sausages are typically cut into angular slices. Hand slicing further conveys to consumers the impression of premium quality and more personalized food preparation.

There is no economical process that can produce high volumes of sliced sausages that appear to have been sliced off the sausage log for human consumption, much less for pet food consumption. Thus, neither conventional pet food manufacturing processes nor traditional food production techniques used for human consumption can meet the requirements of cost-effectively manufacturing slices of semi-moist, shelf-stable, meat patties that appear to have been cut at an angle from a conventional round skinned sausage log. Moreover, there are no economic methods for forming such angled sausage slices in a continuous manufacturing process.

SUMMARY OF THE INVENTION

Illustrative embodiments of the present invention include apparatus, systems and methods for manufacturing slices of reconstituted food products that appear to have been cut from a previously whole food product at an angle. Particularly, the disclosed invention is useful for manufacturing a sliced sausage, meat or other proteinaceous product that appears to have been cut at an angle from a whole, skinned sausage. In one illustrative embodiment, the present invention utilizes knockout cavities and knockout cups that are angled, to develop an animal treat that looks similar to human grade skinned sausage log that has been sliced at an angle, and the exposed faces of the sausage patty reveal the product ingredients such as beef muscle chunks, rice, or apples.

Shown herein, as another illustrative embodiment, is a manufacturing process for making portions to be finished into angled pet treats comprising: (a) providing a ground mix of proteinaceous material, flavor enhancers and preservatives to a forming chamber comprising: a fixed base surface, a fixed top surface, and a movable intermediate section insertable between said base and top surfaces, said intermediate section having a plurality of die cavities that each have a central axis oblique to the surface of said intermediate plate, said top surface having a plurality of feeder holes that overlap at least partially with said die cavities, (b) filling said plurality of die cavities via said feeder holes with said foodstuff, thereby forming a plurality of portions in shapes and dimensions that generally correspond to the shapes and dimensions of said die cavities, (b) moving said intermediate section containing said plurality of portions out of said chamber, (c) forcibly ejecting said portions with a plurality of longitudinal elements that reciprocate in and out of said die cavities along said central axis, thereby forming angled pet treats.

While embodiments of the present invention are described primarily with respect to pet food products and pet sausage treats in particular, it should be appreciated that the disclosed apparatus, systems and methods may be applied to the cost-effective production of a broad range of food products, whether intended for pet or human consumption.

It will be appreciated by those skilled in the art that the foregoing brief description and the following detailed description are exemplary and explanatory only, and are not intended to be restrictive thereof or limiting the invention. Thus, the accompanying drawings, referred to herein and constituting a part hereof, illustrate only preferred embodiments of the invention, and, together with the detailed description, serve to explain the principles of the invention.

BRIEF DESCRIPTION OF THE DRAWINGS

FIGS. 5A-B, 6A-B, and 7A-B, show angled patties formed and knocked out at 60°, 45°, and 30°, respectively, according to an illustrative embodiments of the invention.

DETAILED DESCRIPTION OF THE PREFERRED EMBODIMENT

Illustrative and alternative embodiments and operational details of apparatus, systems and methods to manufacture a plurality of angled patties and/or sausage treats of varying texture in a continuous process will be discussed in detail below with reference to the figures provided. The subject invention is generally relevant to any edible food product produced at least in part through extrusion, including apparatus, systems and methods for making such products. One preferred product, however, is an edible food product for animal consumption, more particularly an angled sausage treat for pets containing meat and/or meat analogs.

Figure 1:
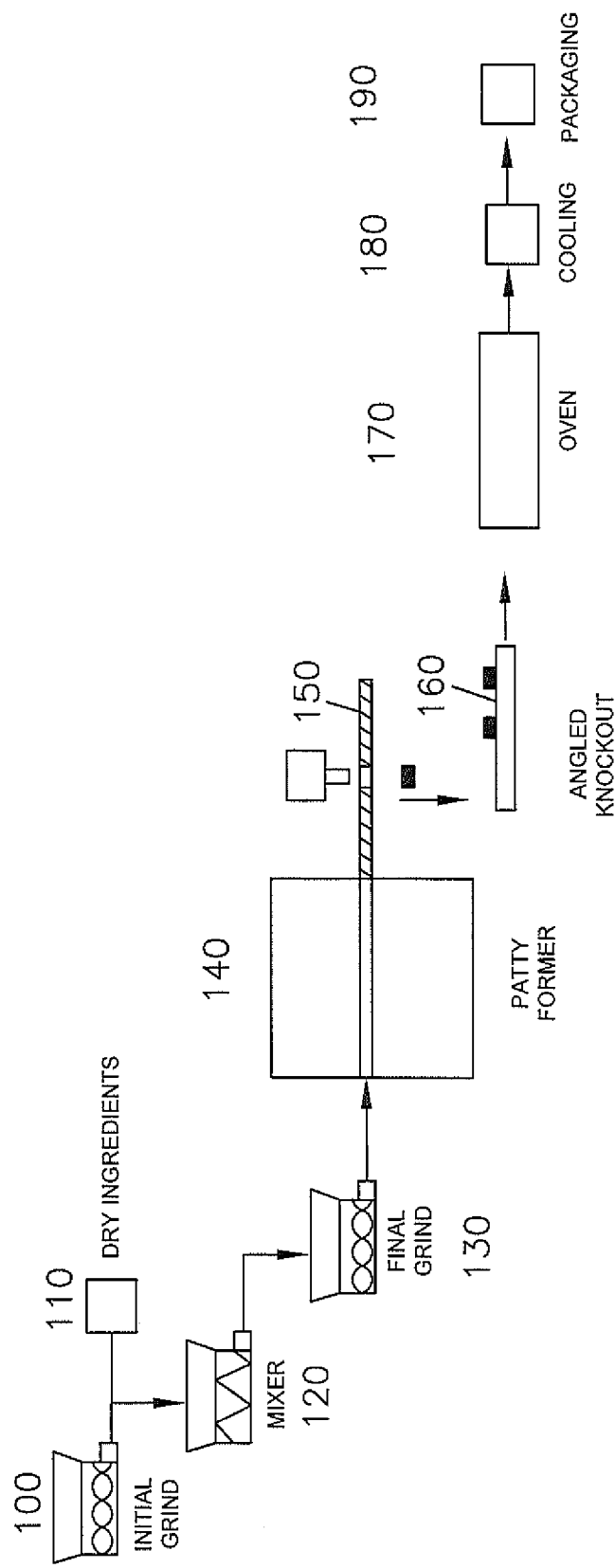
FIG. 1 is an overall process schematic for making patties with angled edges, according to an illustrative embodiment of the invention.

In one illustrative embodiment of the invention shown in FIG. 1, frozen blocks of muscle meat, organs or any appropriate proteinaceous material are processed through a first grinder (100) containing a grinding plate with openings that are 1/16" to 1" in diameter, preferably approximately 3/8", resulting in an output that has large chunks of meat. The ground meat is batched and mixed in a mixer (120), typically a ribbon flight mixer or a sigma blade mixer or a solid screw mixer. Dry and liquid ingredients (110) are added to the meat batch in the mixer. The mixed batch may also be processed with a second grinder (130) containing a grinding plate ideally with 3/8" diameter openings, or otherwise with openings between 1/16" and 1," that assists in the consistent mixing of both longitudinal grains and smaller chunks of meat in such a way that the resultant meat emulsion can be extruded easily. This additional grinding step, if used, can also contribute to the appearance and texture of the final angled patty or sausage product. Note also that while the grinding and mixing steps described herein are a preferred embodiment, similar results can also be attained by separately sourcing pre-ground (and pre-mixed) proteins and other ingredients, and then using this externally sourced ground mix as the starting raw material to carry out the rest of the process steps described in FIG. 1 and below.

The ground meat emulsion is fed into the hopper of a patty former (140, and explained in further detail infra) which in turn fills a knockout plate (150) located proximately. Once the knockout plate is filled, the plate extends beyond the hopper walls to the knockout area. The product is knocked out (160) and collected on trays. The trays are fed then into an oven dryer (170). If a continuous belt is used, then the belt feeds directly into the oven. The angled patties are dried ideally at between 140° and 180° F., but anywhere between 130° and 250° F., for several hours, ideally in the range of 4-6 hours. The temperature and drying profile is important to prevent the generation of skin or shriveling of meat in the product. After drying, the sausage patties are cooled (180) for 1-4 hours at ambient temperature before continuing to packaging (190). A non-ambient air cooling operation may also be used.

Figure 2:
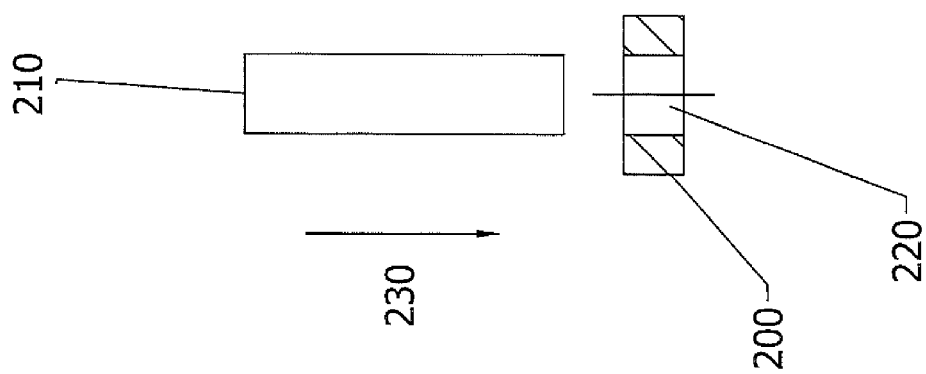
FIG. 2 is an illustration of the basic configuration of a conventional knockout forming system typically employed in the prior art.
Figure 3A:
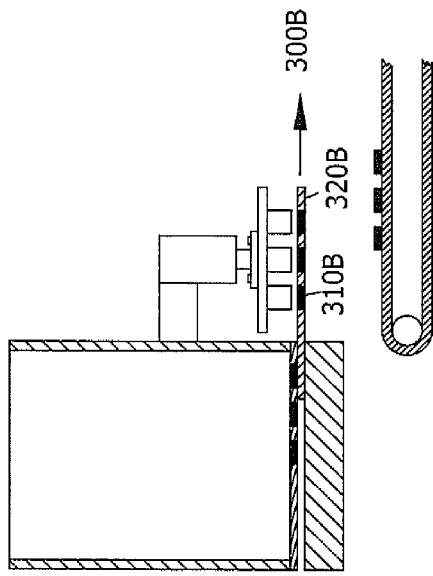
FIG. 3A-D is an illustration of the operation of a standard patty forming system typically employed in the prior art.
Figure 3B:
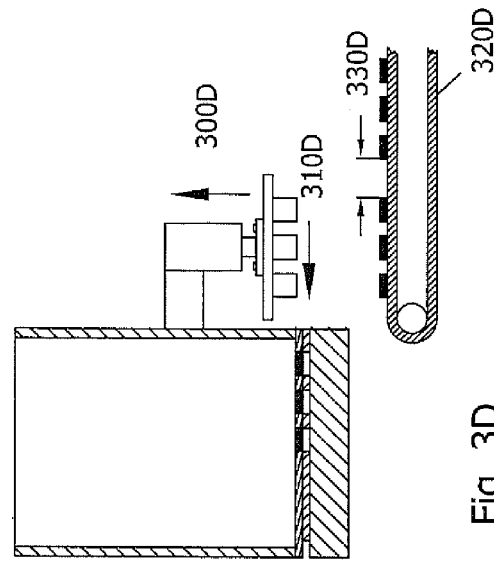
Figure 3C:
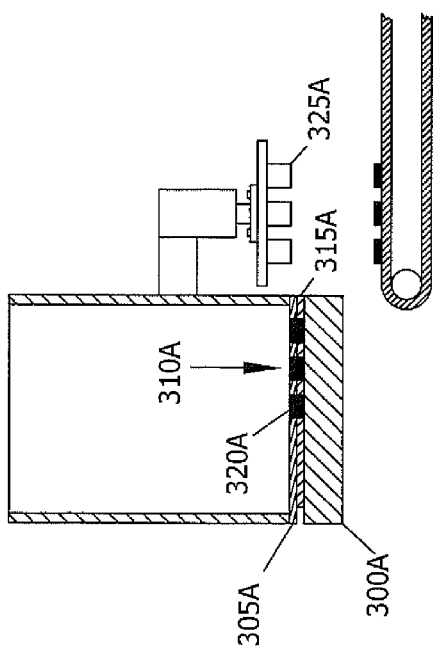
Figure 3D:
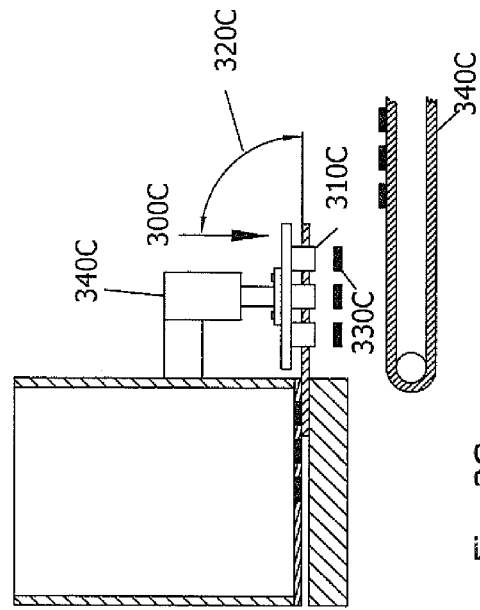

Before describing the patty former and knockout system used in the process of FIG. 1 (140, 150) of the present invention, it is helpful to first discuss conventional approaches of the prior art in some more depth. A typical prior art knockout system used in a standard patty former is illustrated in FIG. 2, and incorporates knockout cavities (220) that fill perpendicular to the face of the knockout plates or surfaces (200). Concurrently, the knockout cups (210) travel along a vertical central axis (220) that is perpendicular to the face of the knockout plate as well. FIG. 3A-3D shows a typical sequence of operations of such a standard patty forming operation in more detail. The patty former contains two stationary plates or surfaces (300A and 305A) between which an intermediate "knockout" section or plate (315A) is positioned. The knock out plate can move in and out of the forming chamber. The knockout plate contains a plurality of holes that serve as molding dies or cavities for the meat emulsion that is fed from the top of the patty former. The molding dies are vertical cylindrical holes with sides that are perpendicular to the top and bottom faces of the knockout plate, which are used to produce cylindrical, disc-shaped patties. The top stationary plate (305A) also has a plurality of feeder holes, with each feeder hole in the stationary plate aligning with a corresponding mold cavity in the knockout plate. When the meat emulsion is fed under pressure (310A) through the forming chamber (301A), it enters through the feeder holes (320A) of the top plate (305A) into the mold cavities of the knockout plate (315A). After the meat is pressed and formed into the mold cavities of the knockout plate, pressure is released, and FIG. 3B shows the knockout plate moved horizontally (300B) out of the chamber, positioning the formed patties (310B) below the knockout plate (320B). The pieces of formed patties (330C) are then forced/knocked out (FIG. 3C) through the motion (300C) of vertical plungers (also known as knockout cups or rods) (310C) that travel perpendicular (320C) to the face of the knockout plates (315A or 320B). The patties then fall to a conveyor (340C) below for further processing. Following the "knockout" segment (FIG. 3C), the knockout cups and knockout plate return to their positions (300D, 310D). While the die cavities (220 or 310B) normally have vertical sidewalls, sometimes the side walls are also slightly tapered outward toward the bottom to facilitate quick product release when the product is eventually punched out by the knockout cups, so that the diameter of the hole at the bottom of the die is slightly larger than the diameter of the hole of the top of the cavity. While the outward tapering coupled with the vertical knock enables a quicker release of the patties during knockout, the resulting end-product still has sides generally perpendicular to the top and bottom, in the familiar disc-shape of hamburger patties.

Unlike the conventional method of the prior art discussed in the preceding paragraph, FIG. 4-FIG. 16 details significant modifications and improvements of the traditional forming process to produce meat or other proteinaceous products with angled edges, in accordance with an illustrative embodiment of the present invention. Starting with FIG. 4, in order to simulate an angled cut, the walls of the fill cavities (420) and path of travel (430) (along the central axis (420)) for the longitudinal knockout members or cups (410) are modified to an angle (440), which can generally be varied 10°-80° from the face of the knockout plate, but is preferably within 30°-60°. The resulting products (FIG. 5A-FIG. 7A) have elongated faces (500A-700A) and angled sides (500B-700B), similar to product that is hand cut from an extruded log or a sausage product for humans that is hand sliced after cooking, exposing the surface. It will be apparent to one skilled in the art that while the intermediate section is described herein as a plate, it can be of other shapes as well, so long as the intermediate section is capable of reciprocating in and out of the patty chamber. Likewise, the top and bottom plates also can also be sections of varying shapes and sizes, so long as the top surface of the bottom section, and the bottom surface of the top section, can be aligned with the top and bottom surfaces of the intermediate section in such a way that the intermediate section can still move in and out of the chamber, and the feeder holes in the top section at least partially align with the die cavities of the intermediate section.

Figure 4:
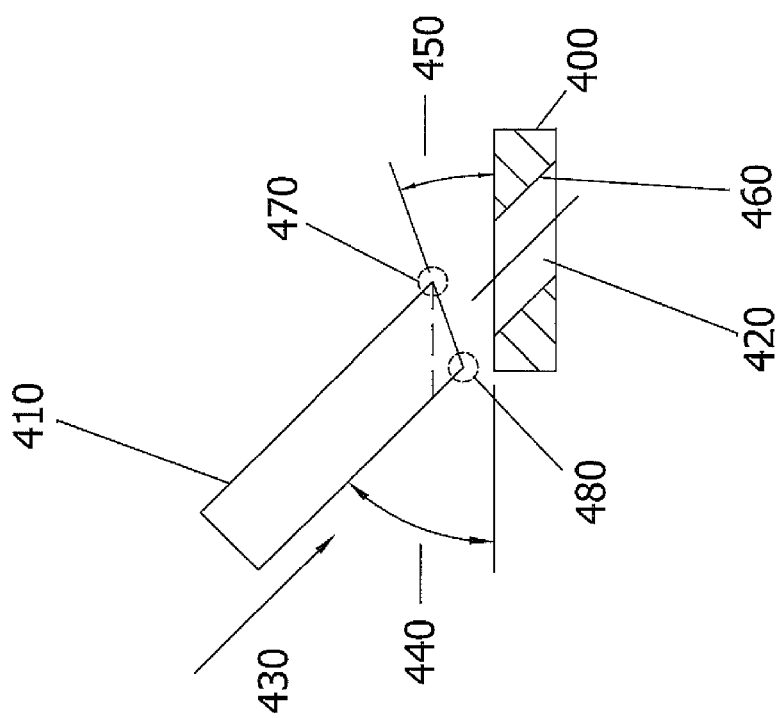
FIG. 4 details an angled knockout system, according to an illustrative embodiment of the invention.
Figure 9A:
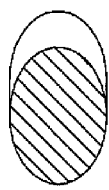
FIGS. 8A-B, 9A-B, 10A-B, and 11A-B, show angled sausage patties of various geometric and non-geometric (irregular) shapes according to an illustrative embodiment of the invention.
Figure 9B:
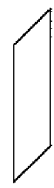
Figure 11A:
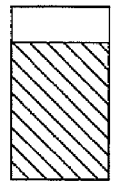
Figure 11B:
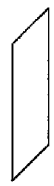
Figure 8A:
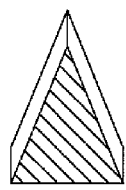
Figure 8B:
Figure 10A:
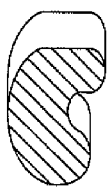
Figure 10B:
Figure 12B:
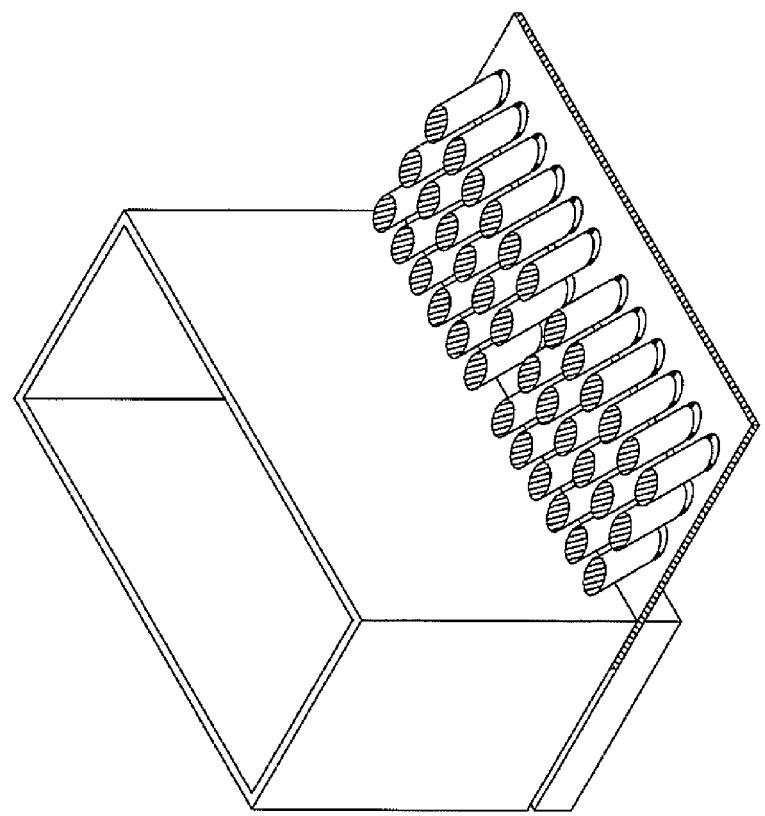
FIG. 12A-B show perspective views of a knockout system configuration that is designed to evacuate angled patty product away from the forming equipment, according to an illustrative embodiment of the invention.
Figure 12A:
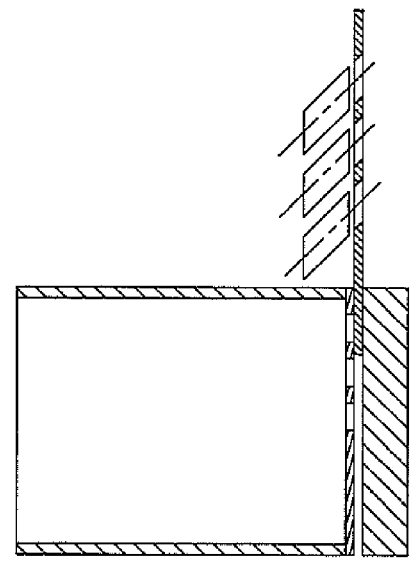
Figure 13A:
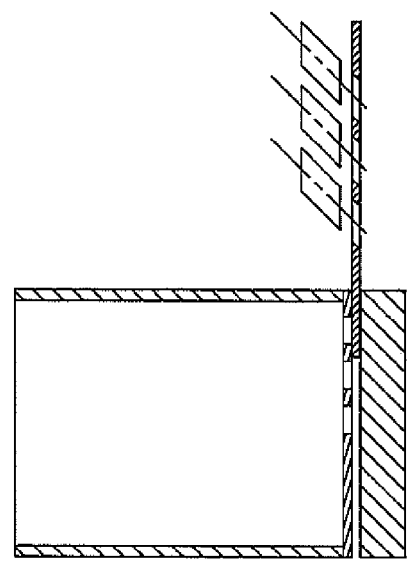
FIGS. 13A and 13B show perspective views of a knockout system configuration that is designed to evacuate angled patty product toward the forming equipment, according to an illustrative embodiment of the invention.
Figure 13B:
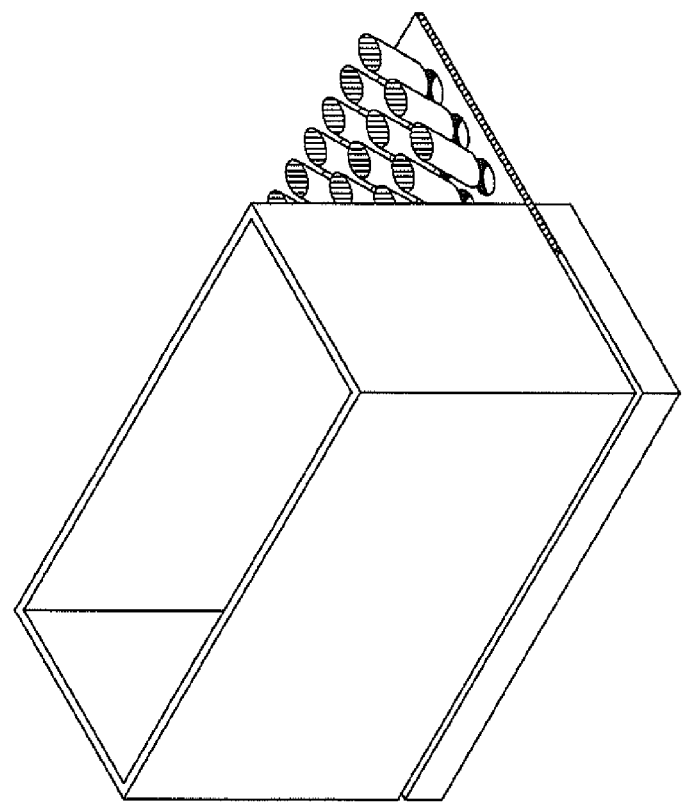

The knockout cup and cavity system shown in FIG. 4 can also be designed to aid the formation of angled meat patties that look like sliced skinned sausage logs. This is done by taking advantage of the shear and frictional forces created by an angular knockout system. Since the formed meat in the cavities is no longer pushed out through downward vertical force and is instead squeezed through an angular hole, there is more frictional and shear forces that the plunger (knockout cup) has to overcome. Referring to FIG. 4, the plunger travelling in the direction (430) encounters more resistance in the "acute angle" half of the cavity (480) when the meat is pushed out, and relatively less resistance in the "obtuse angle" side (470). This additional resistance (as compared with less resistance for the vertical systems of the prior art described supra) enables the end product to appear raised around the patty edges. In other words, the frictional and shear forces of the angled plunger can be utilized, if necessary, to create an "overhang" at the edges of the patties, giving it a more natural "skinned sausage slice" look. While the plunger diameter must be less than the diameter of the cavity, even this difference can be emphasized as another variable that determines the quality of the "skinned slice" look. Higher the difference between the diameter of the plunger and the diameter of the cavity, thicker is the "skin" formed by shear at the end of the sausage, but these differences in diameter cannot be too large or the plunger will just jab through the middle of the patty. Typically the diameter of the plunger is adjusted to within about 10% of the diameter of the cavity. Further, this plunger is also designed in a way where the contact face of the plunger (480 to 470) is usually at an angle (450) to the face of top face of the mold plate (400)—in other words the contact face is often designed to be parallel to the horizontal top face of the mold plate (400). This enables the plunger to first contact the molded meaty material at (480) and, as it pushes its way through, also contact the material at (470), eventually pushing the whole product out. Because of the differential force between the two corners (470 and 480), the overhanging skin is also more pronounced at one side of the log, making the appearance of the final product closer to the appearance of a sliced skinned sausage log. Depending on the dimensions and features of the product required, and the type of ingredients and process conditions used, this plunger contact angle (450) is varied from about 5°-50°.

Chunks of muscle meat, rice, etc. (ingredient alternatives for a preferred embodiment) are discussed further in TABLE 1 below, and are also visible on the surface of the patties. Adjusting the initial moisture content of the blend of proteinaceous material and the temperature and length of the drying operation further contributes to either a wrinkled or smooth appearance of the product. For example, the skin formed on the sides and top as a result of slow drying can further enhance the appearance of the quality of human grade sausage pieces cut from whole sausages. The angled cavity-knockout system may also incorporate the shapes of circles, ellipses, triangles, squares, non-geometric shapes and other irregular shapes (FIG. 8-11). In a production setting, the knockout system would incorporate as many as 2 to 200 cavities with reciprocating knockout cups (similar to the 36 cup production system shown in FIG. 12A-12B).

Figure 14C:
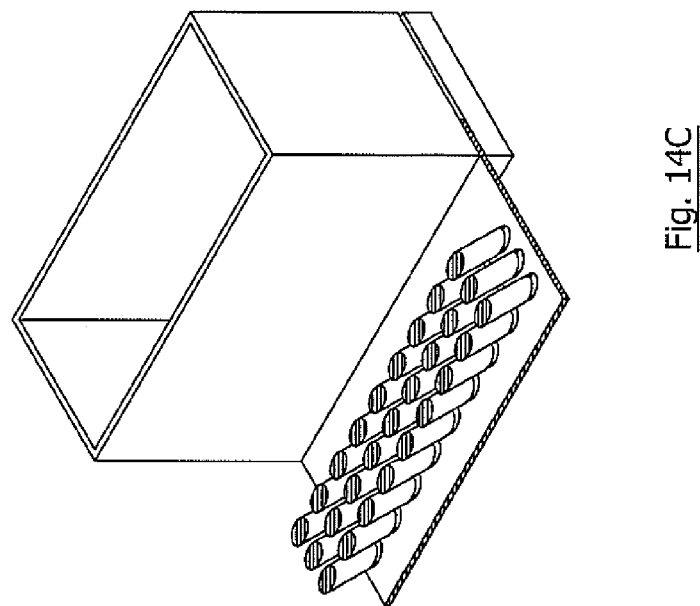
FIGS. 14A, 14B and 14C show perspective views of a knockout system configuration that is designed to evacuate angled patty product parallel to the forming equipment, according to an illustrative embodiment of the invention.
Figure 14B:
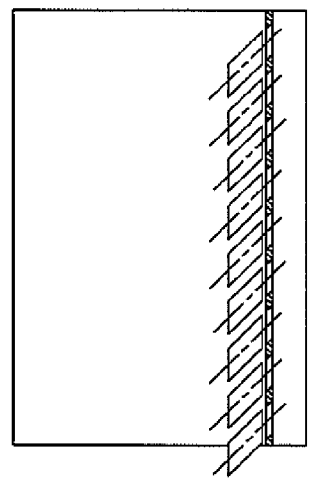
Figure 14A:
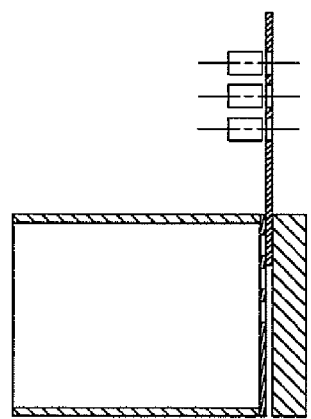

As one skilled in the art will recognize, there are many possible ways for implementing production grade systems containing multiple die cavities for operation with multiple knockout members. Much of this will depend on space, and desired process and engineering considerations. For instance, the knockout assembly can be arranged to evacuate angled patties that drop to the conveyor (see FIG. 1, 150-160) in different configurations. The knockout cups can be angled away from the forming equipment (FIG. 12A, FIG. 12B), or towards the forming equipment (FIG. 13A, FIG. 13B), or parallel to the forming equipment (FIG. 14A, FIG. 14B). FIG. 1, (150), can also be considered as an angled knockout system that is parallel to the forming equipment (140), similar to FIG. 14.

Figure 15B:
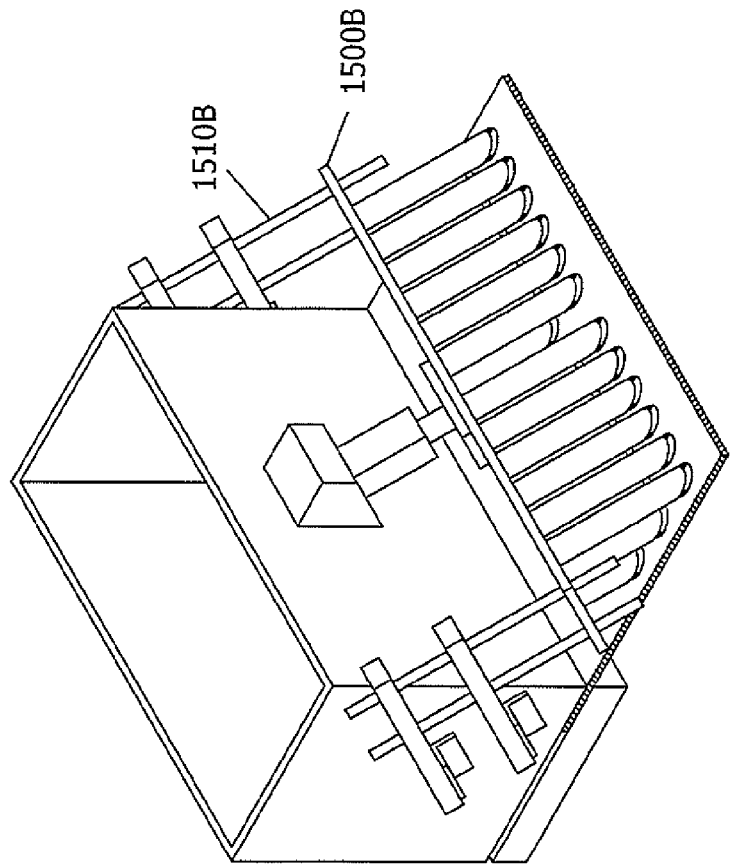
FIGS. 15A and 15B show a mechanism for implementing angular knockout cups using an actuator mechanism mounted at an angle to enable a reciprocating knockout action at any desired angle, according to an illustrative embodiment of the invention.
Figure 15A:
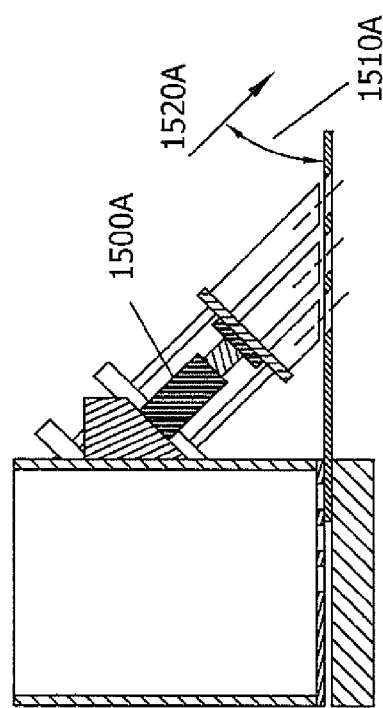
Figure 16B:
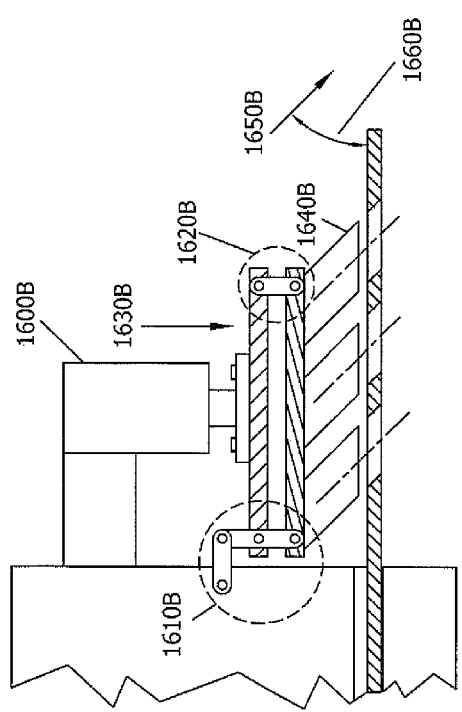
FIGS. 16A, 16B and 16C show a mechanism for implementing angular knockout cups using a vertical actuator mechanism working in conjunction with a hinged mechanism to enable a reciprocating knockout action at any desired angle, according to an illustrative embodiment of the invention.
Figure 16C:
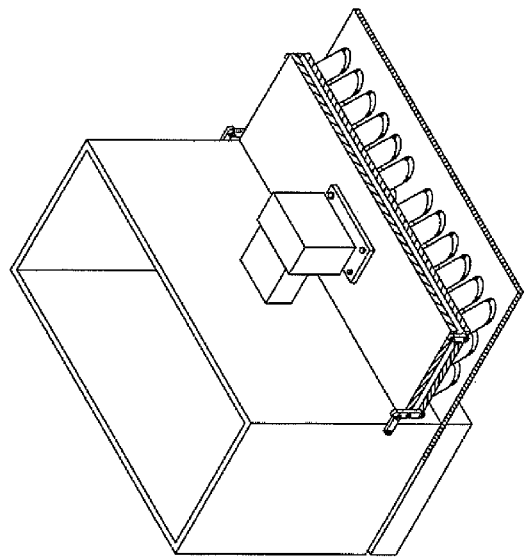
Figure 16A:
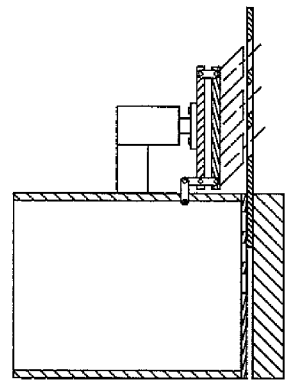

There are also many possible mechanisms for implementing multiple knockouts at an angle, and a few of these are illustrated in FIG. 15 and FIG. 16. FIG. 15 involves mounting an actuator (1500A) in the angle (1510A) of desired angular reciprocating motion (1520A). The knockout elements are attached to a mounting plate (1500B) would ultimately be directed by the actuator to ensure an angular reciprocating action. Another solution, FIG. 16, incorporates a vertical actuator (1600B) working with a hinged mechanism (1610B, 1620B). The vertical motion (1630B) of the vertical actuator (1600B) is translated to a rotation of the hinge mechanism which drives the knockout assembly (1640B) in the direction (1650B), in the desired oblique angle (1660B) for the patties. Other solutions may include the use of cam systems or multiple actuators (not shown). Note also that it is possible to produce products where the cavities and plungers vary in size so that the products cumulatively produced during a process run appear to be of varying shapes and sizes, thereby simulating a product mix that has a more random and natural look.

While the foregoing description explains the manufacturing process used to make the product, it is also important to note, as will be evident to one skilled in the art, that the type and relative proportions of ingredients used in making the product also plays a role in the texture, semi-moistness and appetizing appearance of the final product. In particular, the increased proportion of meat used in this process helps develop a rough texture that appears more like human grade sausage.

Two recipes (A and B) are shown below to demonstrate some typical proportions of proteins and other ingredients used in the beginning of the process (FIG. 1 at mixer 120) to make an angled sausage or patty treat for animal consumption (numbers below are in weight percent):

| Component | Recipe A | Recipe B |
|---|---|---|
| Meat/Animal Protein | 62% | 59% |
| Plant Protein | 6% | 10% |
| Starches | 15% | 20% |
| Flavors | 15% | 10% |
| Preservatives | 2% | 1% |
| TOTAL | 100% | 100% |

While the recipes above are specific, TABLE 1 below illustrates the broader ranges of composition of the key components that can be used in conjunction with the process described herein to make angled proteinaceous food treats for animal consumption. Some of these combinations would also be useful for making long-lasting products for human consumption, as will be appreciated by one skilled in the art. Note that many of these starting ingredients (e.g., beef or chicken or vegetables) inherently contain water.

TABLE 1

| Category | Typical examples/comments | Proportion (wt %) |
|---|---|---|
| Proteins | Chicken, beef, pork, turkey, venison, duck, etc., or a combination. Premium and lower grade meats, or offal, could also be used. Meat analogs such as soy or vegetable protein can also be used for developing more healthy snacks. | 40-70% |
| Flours/Starch/Carbohydrates | Wheat, soy, corn, tapioca, etc., or a combination | 0-20% |
| Vegetables/Fruits | Apples, banana, sweet potato, cranberry, carrots, peas, etc., or a combination | 0-10% |
| Flavor enhancers | Sugar, salt, garlic, onion, digests. | 5-20% |
| Preservatives | Potassium sorbate, sorbic acid, butylated hydroxyanisole (BHA), butylated hydroxytoluene (BHT), mixed tocopherols, calcium propionate, zinc propionate, rosemary extract, citric acid, sodium erythobate, | 0.01-5% |

Accelerated testing studies have also indicated that recipes A and B produce pet treats that are shelf stable for at least 18 months, maintaining a stabilized intermediate moisture content (15-30% by weight, usually 18-26%), and stabilized water activity (Aw ranging from 0.60 to 0.78, usually 0.65-0.75%) without refrigeration under normal conditions of storage in homes or stores that are reasonable and expected for the packaged pet foods industry. The ingredient mix, within the composition ranges in TABLE 1 provided above, can also be adjusted as needed by one skilled in the art to ensure that similar stabilized moisture content and water activity is achieved to create final packaged products that are semi-most and shelf-stable for at least 18 months.

It will be apparent to one skilled in the art that the final shape and texture of the end products, and their size and thickness distributions, whether for animal or human consumption, can be pre-designed and/or manipulated on-the-fly during the manufacturing process by pre-selecting and/or dynamically adjusting various process variables. These variables include, but are not limited to, the following:

1. Having a range of repeating and/or irregular patterns, sizes and shapes of the knockout cups to develop an assortment of product sizes and shapes in a process run (FIG. 5A, 10A, 11A, 8A).
2. In addition to the drying conditions described above, the angle of the knockout, which in conjunction with the composition of the mix (see 3 below), are important in optimizing the "wrinkled edges with skin" appearance and grainy texture of the final product. A vertical knockout system imparts almost the same uniform force across the patty, whereas the oblique knockout has more variation in the imparted force across the "slice" of the sausage, particularly a sharper difference in force between the edges of the slice and the center that is caused by differential shearing, which in turn is typically a function of the oblique angle, the speed of the knockout cups, the materials and composition of the patty blend, the temperature and pressure during compaction of the patties.
3. Speed of the reciprocating angled knockout cups can be adjusted along with the speed of the conveyor to create differences in the product appearance. For instance at relatively slower speeds, the knockout cup will stretch the meat out more "gently" before dislodging it into the angular slice, thereby creating more differential stress between the center and the edges, and this results in more of a pulled or torn look that would be created by a person using a blunter knife on a sausage log.
4. Variations in composition within the ranges prescribed in Table 1. For instance, increasing the meat concentrations and lowering or eliminating carbohydrates will increase the leathery, grainy or wrinkled texture of the product. Note that increasing the ratio of premium muscle meat to lower grade meat (including offal), will also increase the natural wholesome look, but this must be balanced with commercial considerations such as cost and consumer preferences. To some extent, the composition can also be adjusted dynamically during processing by adding multiple feed points, each independently controllable, instead of the fixed set of dry ingredients (110) suggested by in FIG. 1.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the claims below.

What is claimed is:

1. A manufacturing process for angled pet treats comprising:
   (a) providing a ground proteinaceous mix to a forming chamber comprising:
      a fixed base surface, a fixed top surface, and a movable intermediate section insertable between said base and top surfaces,
      said intermediate section having a plurality of die cavities that each have a central axis oblique to the surface of said intermediate plate,
      said top surface having a plurality of feeder holes that overlap at least partially with said die cavities,
   (b) filling said plurality of die cavities via said feeder holes with said foodstuff, thereby forming a plurality of portions in shapes and dimensions that generally correspond to the shapes and dimensions of said die cavities,
   (c) moving said intermediate section containing said plurality of portions out of said chamber,
   (d) forcibly ejecting said portions with a plurality of longitudinal elements that reciprocate in and out of said die cavities along said central axis, thereby forming angled pet treats.

2. The process of claim 1 wherein said intermediate section has a parallelepiped structure.

3. The process of claim 1 wherein said base and top surfaces are (a) substantially flat and (b) substantially parallel to each other.

4. The process of claim 3 wherein the acute angle formed between said surfaces and said central axis is between about 10 degrees and about 80 degrees.

5. The process of claim 1 wherein said die cavity is in the form of an oblique cylinder.

6. The process of claim 1 where said longitudinal elements are designed to be operable along said central axis through the use of a vertical actuator and a hinge mechanism.

7. The process of claim 1 where said longitudinal elements are designed to be operable along said central axis through the use of an obliquely mounted actuator, where said obliquely mounted actuator is movable along an axis parallel to said central axis.

8. The process of claim 1 wherein the angle between the surface plane at the distal end of each of said longitudinal elements, and the plane passing through said top surface, is between about 5 degrees and about 50 degrees.

9. The process of claim 1 where the diameter of the distal end of each of said longitudinal elements is within about 10% of the nominal diameter of each corresponding said die cavities.

* * * * *